United States Patent
Pate

(10) Patent No.: US 7,025,175 B1
(45) Date of Patent: Apr. 11, 2006

(54) VENT MECHANISM

(76) Inventor: Kevin M. Pate, 11225 Denzer Rd., Evansville, IN (US) 47712

( * ) Notice: Subject to any disclaimer, the term of this patent is extended or adjusted under 35 U.S.C. 154(b) by 339 days.

(21) Appl. No.: 10/403,495

(22) Filed: Mar. 31, 2003

Related U.S. Application Data

(60) Provisional application No. 60/384,897, filed on May 30, 2002.

(51) Int. Cl.
   *F16H 57/02* (2006.01)
(52) U.S. Cl. .................... 184/6.23; 137/554; 200/83 N
(58) Field of Classification Search ............... 184/6.12, 184/6.23; 137/554; 200/83 R, 83 N, 83 A, 200/83 S, 83 SA; 74/606 R, 607; 55/320, 55/385.3, 385.4
   See application file for complete search history.

(56) References Cited

U.S. PATENT DOCUMENTS

| | | | | |
|---|---|---|---|---|
| 1,582,154 A | * | 4/1926 | Zeiher et al. ............. 200/83 N |
| 4,149,504 A | * | 4/1979 | Walters ...................... 123/520 |
| 4,352,301 A | * | 10/1982 | Fleury ......................... 74/467 |
| 4,626,344 A | * | 12/1986 | Fick et al. .................... 210/90 |
| 4,754,732 A | * | 7/1988 | Kuczenski et al. ...... 123/196 S |
| 4,903,672 A | * | 2/1990 | MacKinnon ................. 123/520 |
| 4,970,913 A | * | 11/1990 | Kielar et al. ............... 74/606 R |
| 5,036,823 A | * | 8/1991 | MacKinnon ................. 123/520 |
| 5,090,873 A | * | 2/1992 | Fain ........................... 417/228 |
| 5,153,396 A | * | 10/1992 | Cummings ................ 200/83 Q |
| 5,425,342 A | * | 6/1995 | Ariga et al. ................. 123/456 |
| 5,702,592 A | * | 12/1997 | Suri et al. ...................... 210/90 |
| 5,813,493 A | * | 9/1998 | Sloan et al. ................ 184/6.12 |
| 5,931,183 A | * | 8/1999 | Yoshihara .................... 137/202 |
| 6,015,444 A | * | 1/2000 | Craft et al. .................... 55/320 |
| 6,058,805 A | * | 5/2000 | Merkler ....................... 74/607 |

* cited by examiner

*Primary Examiner*—Chong H. Kim
(74) *Attorney, Agent, or Firm*—George H. Morgan P.E.; Mark A. Manley P.E.

(57) ABSTRACT

An vent mechanism comprising an upper housing, a lower housing, a diaphragm comprising a diaphram contact contained between the housings, an upper contact, an insulator insulating the upper contact from the upper housing, and an internal ground wire between the diaphram contact and the lower housing.

When used as part of a electrical circuit with an indicator, the diaphram senses oil vapor pressure build up. When a given level of pressure is obtained, the diaphram contact moves against the upper contact and the vent mechanism is grounded, completing the electrical circuit, enabling the indicator to function as intended.

10 Claims, 3 Drawing Sheets

VENT MECHANISM

CROSS REFERENCES TO RELATED APPLICATIONS

Provisional Application for Patent No. 60/384,897 of May 30, 2002 with the same title, "Vent Mechanism" which is hereby incorporated by reference. Applicant claims priority pursuant to 35 U.S.C. Par. 119(e)(i)1

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to an oil reservoir vent mechanism that senses a rise in pressure and reacts by grounding an electrical signal which enables an appropriate indicator to warn of the pressure rise. This is a means of avoiding seal damage from pressure rise in, but not restricted to, axle housings and differentials.

2. Background Information

Many drive axle seals fail because of over pressurization of gear oil in an axle housing as a result of a clogged breather.

A patent search was conducted in Class 475, subclasses 158 and 160; Class 74, subclasses 607 and 606R; Class 184, subclasses 6.12, 6.23, 59, and 108.

The following patents were uncovered:

| | | |
|---|---|---|
| 6,058,805 | Merkler | May 9, 2000 |
| 6,015,444 | Croft et al | Jan. 18, 2000 |
| 5,813,493 | Sloan et al | Sep. 29, 1998 |
| 5,702,592 | Suri et al | Dec. 30, 1997 |
| 4,970,913 | Kielar et al | Nov. 20, 1990 |
| 4,626,344 | Fick et al | Dec. 2, 1986 |
| 4,352,301 | Fleury | Oct. 8, 1982 |

While considerable inventive talent at major corporations seems to be addressing problems of drive axle housing and differential lubrication, none of said talent seems to be concerned with preserving axle seal life.

As will be seen from the subsequent description, the preferred embodiments of the present invention overcome limitations of existing approaches to prolonging axle seal life.

Clogged breather caps on oil reservoirs are a much broader problem than just on mobile equipment axles. This is also a problem for hydraulic systems in general, as clogged breather caps can cause hydraulic system malfunctions such as cavitating pumps.

As will be seen from the subsequent description, the preferred embodiments of the present invention overcome limitations of existing solutions to the problem of clogged breather caps.

SUMMARY OF THE INVENTION

The present invention is a vent mechanism for an oil reservoir enabling a means of informing an operator when a breather cap mechanism is no longer capable of breathing. This is advantageous for avoiding seal failures when the oil reservoir is a gear oil reservoir serving a gearing arrangement such as, but not restricted to, a truck axle differential housing, a transmission, or a gear box.

In the preferred embodiment of the present invention, the vent mechanism comprises an upper housing, a lower housing, a diaphragm comprising a diaphragm contact crimped between said housings, an internal ground wire from the diaphragm contact to the lower housing, an upper contact, a stem, and an insulator which electrically insulates the upper housing from the upper contact.

The lower housing comprises vent apertures.

As oil vapor pressure builds up in a gear oil reservoir, pressure is communicated through an aperture in the stem, through the vent apertures, to the diaphram. At a give pressure, the diaphragm contact contacts the upper contact, completing an electrical ground.

Completion of the electrical ground permits current to flow from a hot wire through an indicator through the vent mechanism, through the ground wire, to the ground to which the ground wire is attached.

The threaded stem is an enablement feature permitting both original equipment manufacturer and aftermarket installation of the vent mechanism onto a differential axle housing. The threaded stem also provides chasis ground for the vent mechanism.

In the preferred embodiment of the present invention, a pressure typically in the order of 1 PSI deflects the diaphram sufficiently to make contact with the upper contact, completing a ground connection which enables a current to flow through the indicator to alert an operator that a pressure induced seal failure is at risk.

DESCRIPTION OF THE PREFERRED EMBODIMENT

Figure 1:
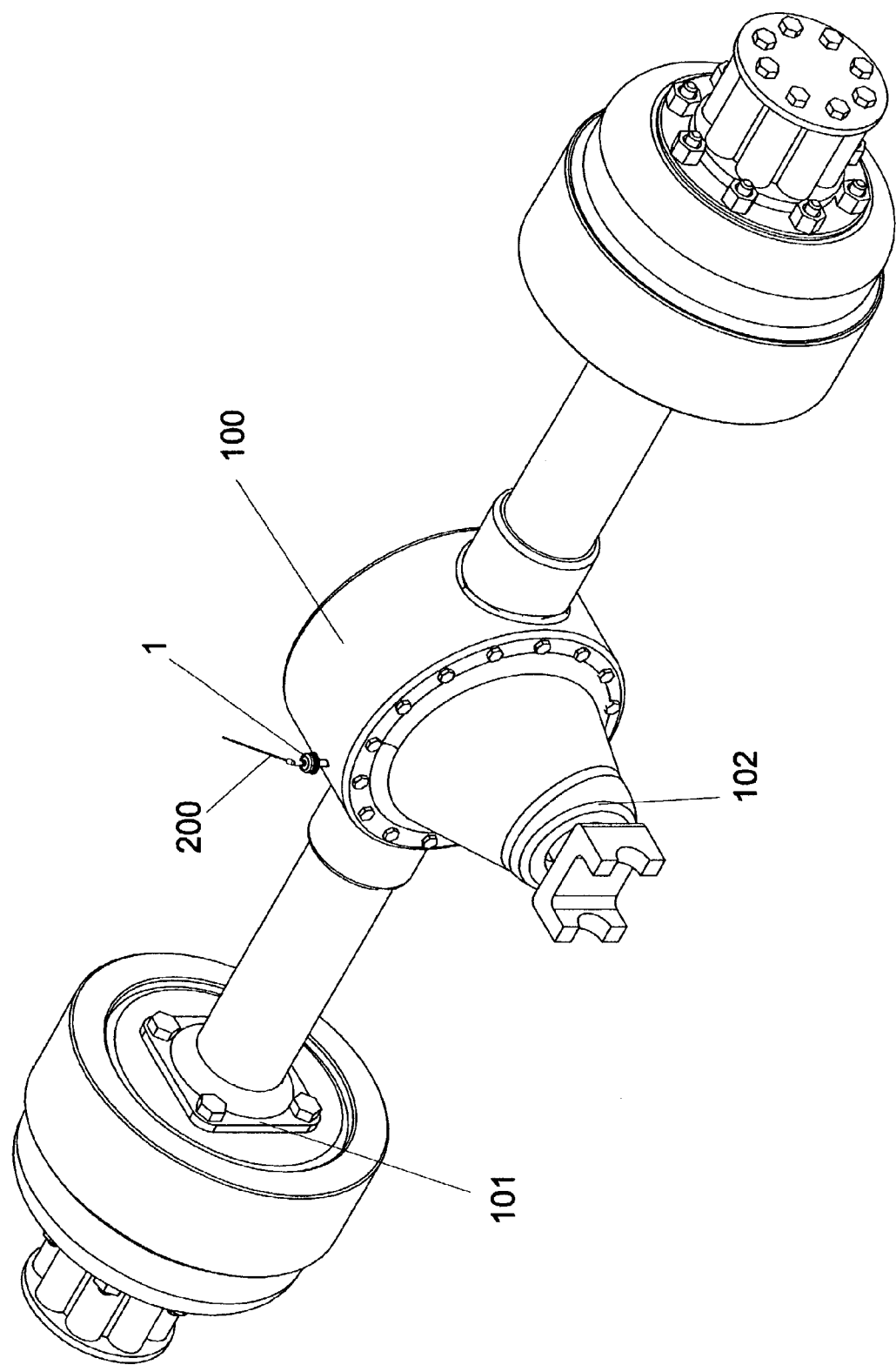
FIG. 1 illustrates an installation of the preferred embodiment of the present invention, a vent mechanism.
Figure 3:
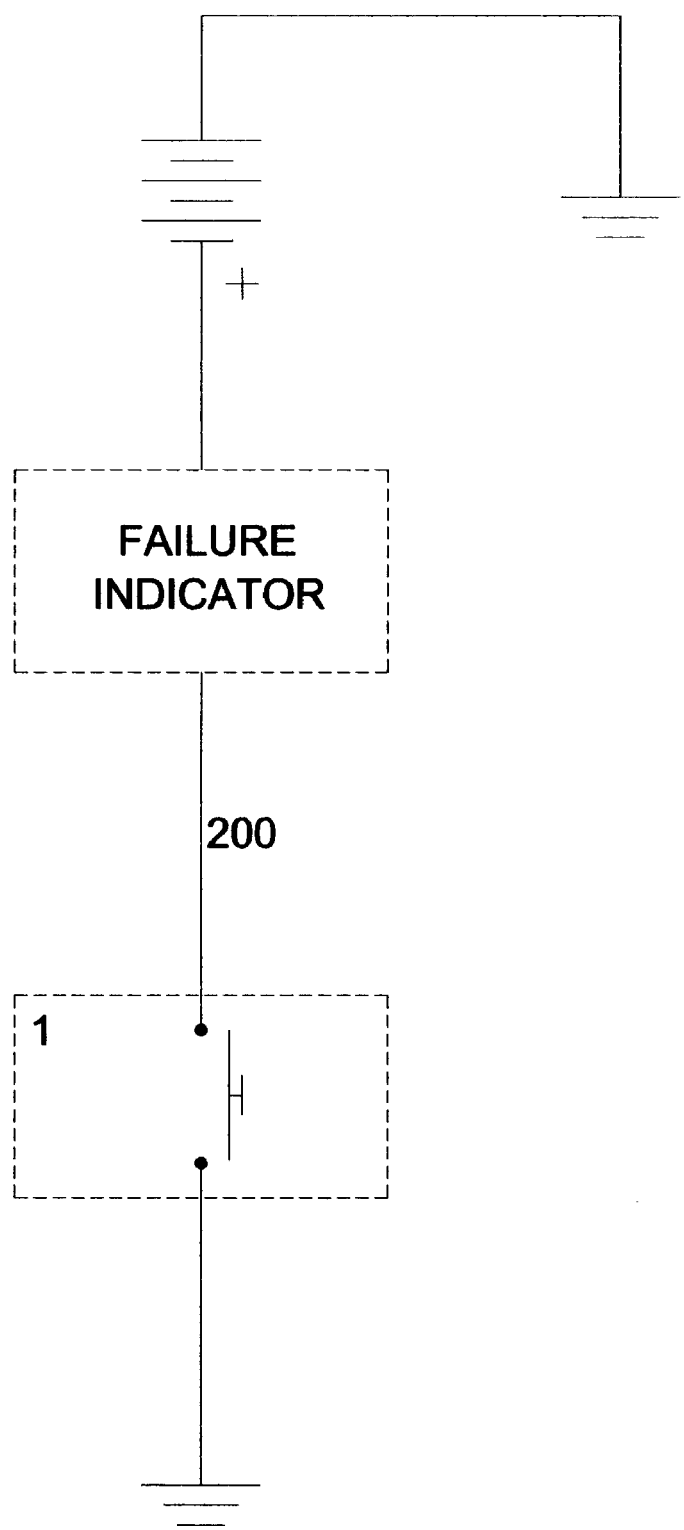
FIG. 3 is a schematic of the installation of the vent mechanism.

FIG. 1. illustrates the preferred embodiment of the present invention, a vent mechanism 1 installed in an axle differential 100, said axle differential serving as a gear lubricating fluid oil reservoir. The vent mechanism 1 is in fluid pressure communications with a wheel end seal 101 and a pinion seal 102. A wire 200 is shown that connects to a failure indicator (ref. FIG. 3 schematic).

Figure 2:
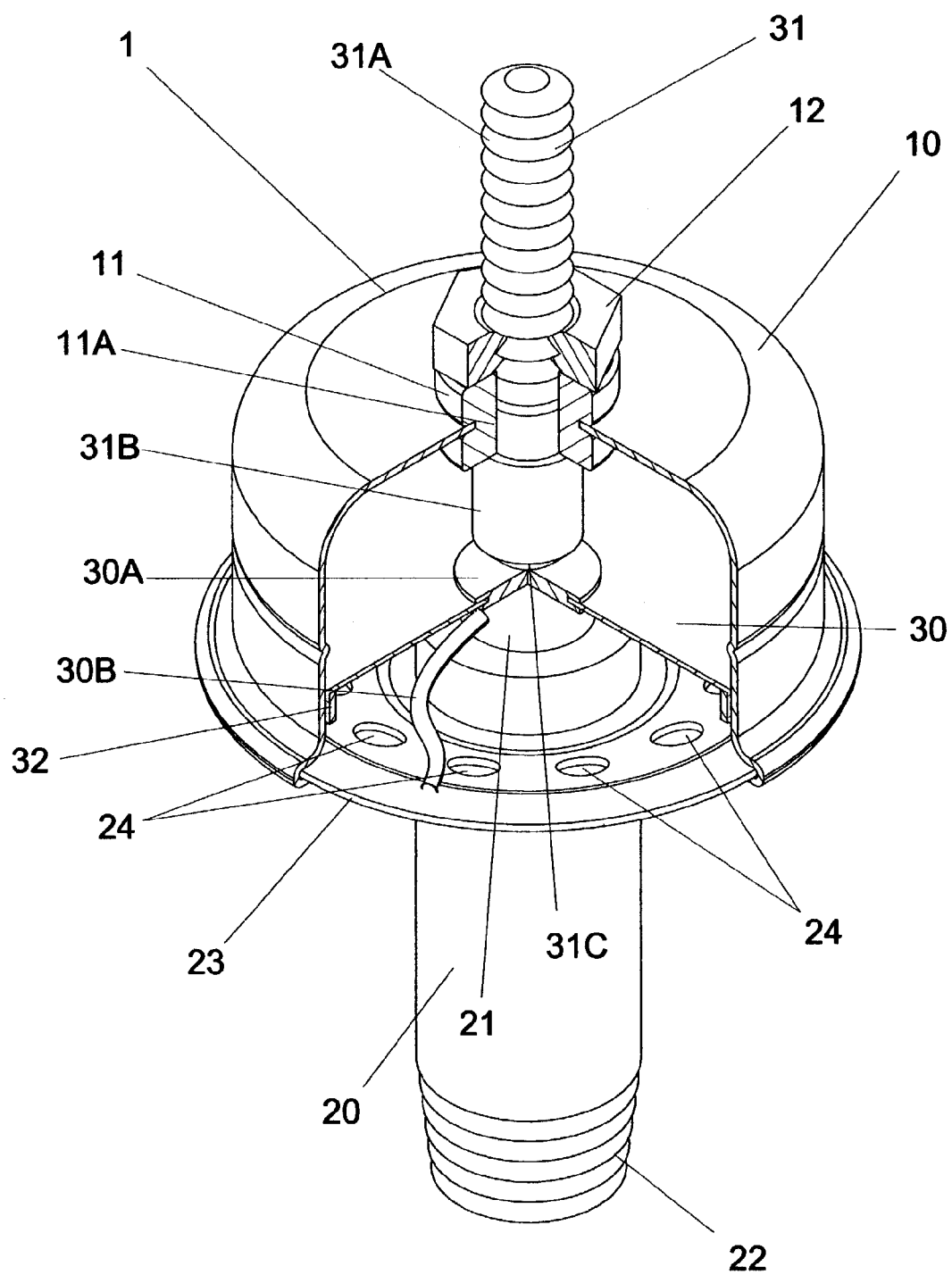
FIG. 2 illustrates the vent mechanism.

FIG. 2 illustrates the vent mechanism 1, comprising an upper housing 10, an insulator 11, an insulator clearance 11A, a nut 12, a stem 20, a stem aperture 21, a stem thread 22, a lower housing 23, lower housing vent apertures 24, a diaphragm 30 comprising a diaphragm contact 30A, an internal ground 30B from the diaphragm contact 30A to the lower housing 23, an upper contact 31, an upper contact threaded end 31A, an upper contact lower end 31B, and an upper contact lower end tip 31C.

The stem 20 is attached to the lower housing 23. The internal ground 30B provides for electrical conductivity from the lower housing to the diaphragm contact 30A. The insulator 11 electrically insulates the upper housing 10 from the upper contact 31.

The diaphragm 30 is contained between the upper housing 10 and the lower housing 23.

The diaphragm contact 30A is not in contact with the upper contact lower end tip 31C, so there is no contact between the upper contact 31 and the diaphragm contact 30A is in an electrical current non-conducting condition.

As fumes build up in the axle housing 100, pressure is transmitted through the lower housing vent apertures to the diaphram 30.

The diaphragm 30, at a given pressure, moves the diaphragm contact 30A against the upper contact lower end tip 31C, resulting in an electrical current conducting condition.

As indicated in the FIG. 3 schematic, wire 200 connects a failure indicator to the vent mechanism 1.

Referring to both FIGS. 1, 2, and 3, when vapor pressure builds sufficiently, the diaphragm 30 deflects until the diaphragm contact 30A contacts the upper contact lower end tip 31C. Electrical current can now move from a battery, as shown in FIG. 3, through the through the failure indicator, through the wire 200, through the vent mechanism 1, i.e. the upper contact 31, through the internal ground 30B, through the lower housing 23, through the stem 23, to the axle differential 100, which serves as a ground.

The failure indicator indicates that there is undue pressure on the pinion seal 102 and whatever other seals, such as, but not restricted to, wheel end seals, that are in fluid vapor communication with the vent mechanism 1.

In the preferred embodiment of the present invention, the diaphram 30 operates at approximately 1 psi.

Although the description above contains many specificities, these should not be construed as limiting the scope of the invention but as merely providing illustrations of some of the presently preferred embodiments of this invention.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A combination vent mechanism and differential housing containing an oil reservoir and seal for said reservoir comprising;
   a) an upper vent housing,
   b) a lower vent housing, said lower vent housing comprising vent holes,
   c) a diaphragm contained between the upper and the lower vent housings, said diaphragm including a lower contact;
   d) an upper contact,
   e) an internal ground,
   f) a stem, said stem including an aperture open to said oil reservoir, and
   g) an insulator which electrically insulates the upper vent housing from the lower contact,
   wherein oil vapor pressure build up in the reservoir is communicated through said aperture to said vent holes in the lower housing to the diaphragm,
   wherein said diaphragm, after a given pressure level is reached within said vent, moves the lower contact into contact with the upper contact, grounding the vent mechanism to power an indicator informing an operator of said pressure level.

2. The combination of claim 1 wherein said indicator is a light.

3. The combination of claim 2 wherein said reservoir includes an axle housing and differential of a vehicle.

4. A combination vent mechanism and gear box housing containing an oil reservoir,
   a vent in communication with said reservoir,
   a diaphragm in communication with said reservoir,
   a first electrical contact, the position of said first electrical contact controlled by said diaphragm,
   wherein said diaphragm, after a given pressure level is reached in said reservoir moves said first electrical contact to complete a circuit indicating said vent is plugged,
   wherein said circuit includes an indicator lamp visible to an operator such that said indicator lamp will warn said operator that said vent is plugged wherein said gear box housing is a vehicle axle including seals and a vehicle differential, and
   wherein said first electrical contact includes an electrically conductive point on said diaphragm and a ground wire attached to said conductive point, a second electrical contact supported adjacent to said first electrical contact such that movement of said diaphragm, caused by pressure in said differential, will cause said first and second electrical contacts to touch.

5. The combination vent of claim 4 wherein said reservoir is an oil reservoir.

6. The combination vent of claim 4 wherein said vent includes a stem threaded into said differential, said stem including a fluid passage to transfer vapor under pressure from said differential to said diaphragm and to said vent.

7. A vapor vent mechanism used in combination with an oil reservoir in a housing containing a seal,
   a vapor vent in communication with said oil reservoir and a vapor of said oil,
   a diaphragm in communication with said reservoir,
   a first electrical contact, the position of said first electrical contact controlled by said diaphragm,
   wherein said diaphragm, after a given pressure level of said vapor is reached in said reservoir moves said first electrical contact to complete an electrical circuit indicating said vapor vent is plugged wherein said circuit includes an indicator lamp, such that said indicator lamp will warn that said vent is plugged, and
   wherein said vent includes threaded passage to transfer vapor under pressure from said differential to said diaphragm and to said vent.

8. The vent of claim 7 wherein said reservoir is a vehicle differential.

9. The vent of claim 7 wherein said first electrical contact includes an electrically conductive point on said diaphragm and a ground wire attached to said conductive point, a second contact supported adjacent to said first contact such that movement of said diaphragm, caused by pressure in said differential, will cause said first and second contacts to touch.

10. The vent of claim 7 wherein said oil is a hydraulic fluid.

* * * * *